(12) United States Patent
Pyo et al.

(10) Patent No.: US 10,354,364 B2
(45) Date of Patent: Jul. 16, 2019

(54) AUTOMATIC PERSPECTIVE CONTROL USING VANISHING POINTS

(71) Applicant: Intel Corporation, Santa Clara, CA (US)

(72) Inventors: Sean Pyo, Yangchun-gu (KR); Sangyup Lee, Seoul (KR); Minje Park, Seoul (KR)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 14/853,272

(22) Filed: Sep. 14, 2015

(65) Prior Publication Data

US 2017/0076434 A1   Mar. 16, 2017

(51) Int. Cl.
  *G06T 3/60*  (2006.01)
  *G06T 3/00*  (2006.01)
  *G06T 7/13*  (2017.01)

(52) U.S. Cl.
  CPC ............... *G06T 3/60* (2013.01); *G06T 3/00* (2013.01); *G06T 3/0093* (2013.01); *G06T 7/13* (2017.01)

(58) Field of Classification Search
  CPC .......... G06T 7/13; G06T 3/00; G06T 3/0093
  See application file for complete search history.

(56) References Cited

U.S. PATENT DOCUMENTS

| | | | | |
|---|---|---|---|---|
| 6,400,848 B1 * | 6/2002 | Gallagher | ............... | G06T 5/006 382/154 |
| 7,737,967 B2 | 6/2010 | Chernichenko et al. | | |
| 10,147,017 B2 * | 12/2018 | Mohamed | ............ | G06K 9/6212 |
| 2004/0103101 A1 * | 5/2004 | Stubler | ............. | G06F 17/30259 |
| 2004/0196282 A1 * | 10/2004 | Oh | .......... | G06T 17/00 345/419 |
| 2005/0036673 A1 * | 2/2005 | Ohba | ...................... | G01C 11/06 382/154 |
| 2005/0179688 A1 * | 8/2005 | Chernichenko | ......... | G06T 5/006 345/427 |
| 2005/0212931 A1 * | 9/2005 | Gallagher | .......... | H04N 5/23248 348/239 |
| 2005/0212951 A1 * | 9/2005 | Miyata | .................... | G02B 7/04 348/345 |
| 2007/0258707 A1 * | 11/2007 | Raskar | ................... | G03B 17/00 396/52 |
| 2010/0329513 A1 * | 12/2010 | Klefenz | ................ | G01C 21/00 382/104 |

(Continued)

OTHER PUBLICATIONS

Hyunjoon Lee, Eli Shechtman, Jue Wang, Seungyong Lee, "Automatic upright adjustment of photographs," In Proc. of CVPR 2012: 877-884.

(Continued)

*Primary Examiner* — Sean T Motsinger
(74) *Attorney, Agent, or Firm* — Green, Howard & Mughal LLP.

(57) ABSTRACT

Techniques related to automatic perspective control of images using vanishing points are discussed. Such techniques may include determining a perspective control vanishing point associated with the image based on lines detected within the image, rotating the image based on the perspective control vanishing point to generate an aligned image, and warping the aligned image based on aligning two lines of the detected lines that meet at the perspective control vanishing point.

25 Claims, 9 Drawing Sheets

(56) References Cited

U.S. PATENT DOCUMENTS

| | | | |
|---|---|---|---|
| 2011/0115902 A1* | 5/2011 | Jiang | H04W 4/026 |
| | | | 348/135 |
| 2013/0094764 A1 | 4/2013 | Campbell | |
| 2013/0287318 A1 | 10/2013 | Schechtman et al. | |
| 2015/0117787 A1* | 4/2015 | Chaudhury | G06T 7/80 |
| | | | 382/199 |
| 2017/0076434 A1* | 3/2017 | Pyo | G06T 3/0093 |
| 2017/0372481 A1* | 12/2017 | Onuki | G06T 5/007 |

OTHER PUBLICATIONS

International Search Report and Written Opinion for International Patent Application No. PCT/US2016/046809, dated Jan. 23, 2017.
Lezama, Jose et al., "Finding Vanishing Points via Point Alignments in Image Primal and Dual Domains", The IEEE Conference on Computer Vision and Pattern Recognition (CVPR), 2014, pp. 509-515.
International Preliminary Report on Patentability for International Patent Application No. PCT/US16/46809, dated Mar. 29, 2018.

* cited by examiner

AUTOMATIC PERSPECTIVE CONTROL USING VANISHING POINTS

BACKGROUND

In image processing contexts, perspective control may include a procedure for generating or editing photographs or images or the like to provide images that better conform to the commonly accepted distortions in the constructed perspective. Such perspective control techniques may be particularly needed when a image is taken of a large subject at a close distance with a tilted camera (e.g., when taking an image of a large building from up close with the camera tilted up to bring the entire building into frame). While tilting the camera may include the whole subject in the frame, such imaging may introduce perspective distortion, which causes exaggerated relative distances differing from what is expected or commonly accepted by a user.

Current techniques to provide perspective control include attaining the image using tilt-shift lenses and post-processing techniques. However, such tilt-shift lenses are large, expensive, and can be difficult to implement properly. Furthermore, current post-processing techniques require the user to provide or select lines in the image that are known to be parallel in the real world, which can be time consuming and, again, may be difficult to implement properly.

It may be advantageous to perform automatic perspective control for images to provide high quality images that have a pleasing appearance. It is with respect to these and other considerations that the present improvements have been needed. Such improvements may become critical as the desire to attain high quality images becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
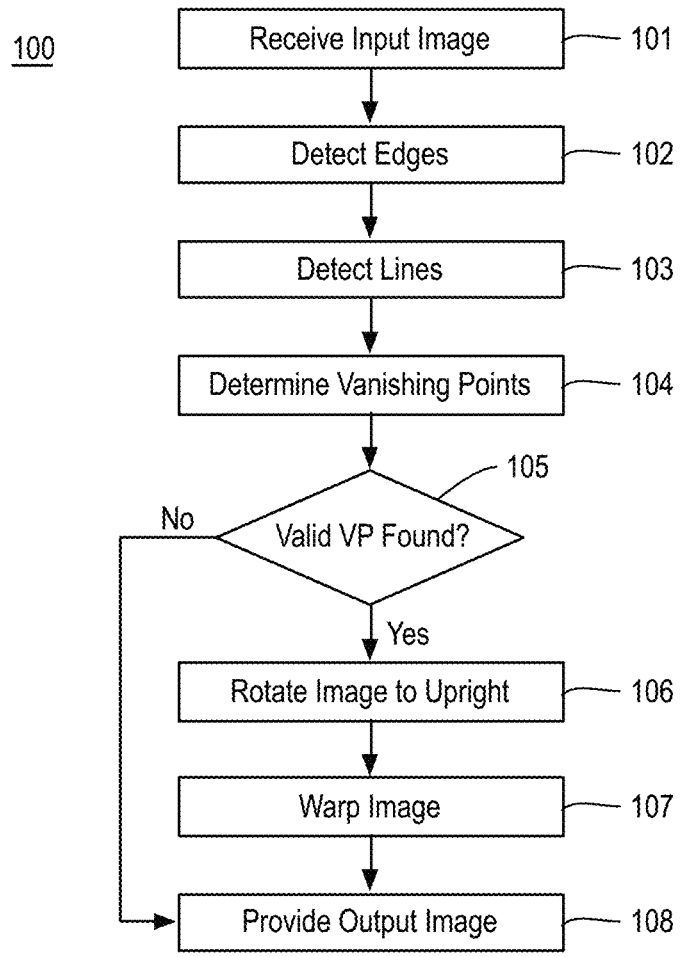
FIG. 1 illustrates an example process for providing automatic perspective control for an image.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", (or "embodiments", "examples", or the like), etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to automatic perspective control for images using vanishing points.

As described above, in imaging processing contexts, perspective control may be provided to images such that the resultant image better conforms to the commonly accepted distortions in the constructed perspective. For example, the resultant image may have a constructed perspective that is more commonly accepted and therefore more pleasing to a viewer of the image. As discussed, in some embodiments, the techniques discussed herein may provide for more pleasing images having a constructed perspective. Such techniques may be advantageously provided to images of buildings, monuments, cityscapes, and the like. In some embodiments, the techniques discussed herein may provide image rectification of, for example, images of documents, signs, or the like to provide for images of such items that provide a substantially flat representation of the item (e.g., based on an angled and/or unaligned input image). The described techniques may provide computational photography techniques, computer vision techniques, image processing techniques or the like to provide a perspective controlled image based on an input image.

In some embodiments discussed herein, providing automatic perspective control for an image may include determining a perspective control vanishing point associated with the image based on lines detected within the image. For example, edge detection may be applied to the image (e.g., the input image) to generate an edge image such as a binary edge image or the like. Lines may be detected based on the edge image based on applying a transform such as a Hough transform or the like to generate a transform map. For example, the transform map may include every candidate line in the image and the number of edge pixels associated with the line. In some embodiments, detected lines may be selected from the candidate lines based on the number of edge pixels (e.g., selecting candidate lines with the highest edge pixel counts). In other embodiments, detected lines may be selected based on selecting a first line with a highest edge pixel count, applying a decremental transform to the transform map to remove contributions of edge pixels associated with the selected line, selecting a second line with a highest edge pixel count, and repeating such processing until a particular number of lines (e.g., 100 or the like) are selected.

Based on the detected lines, one or more vanishing points may be determined for the image. In some embodiments, to determine the one or more vanishing points, an image space associated with the image may be divided into bins and intersections between the detected lines may be inserted into the associated bin (e.g., location in the image space). A first vanishing point may be selected based on the location associated with the bin having the most intersections. Furthermore, the detected lines contributing to the intersections at the bin of the first vanishing point may be associated with the first vanishing point and removed for the determination of a second and a third vanishing point. As will be appreciated, an image may have at most three vanishing points and, for some images, zero, one, two, or three vanishing points may be determined using such techniques. Based on such vanishing points, a perspective control vanishing point may be selected as a vanishing point closest to a vertical axis of the image (e.g., for perspective control associated with providing a constructed perspective).

The image may then be rotated based on the perspective control vanishing point (e.g., by rotating the input image about its center to move the perspective control vanishing point to the vertical axis) to generate an aligned image. The aligned image may be warped based on aligning two lines such as two outer lines of the detected lines that meet at the perspective control vanishing point to generate a perspective controlled image. For example, the warping may include generating a homographic mapping based on aligning two outer lines to parallel and applying the homographic mapping to the aligned image.

FIG. 1 illustrates an example process 100 for providing automatic perspective control for an image, arranged in accordance with at least some implementations of the present disclosure. Process 100 may include one or more operations 101-108 as illustrated in FIG. 1. Process 100 may be performed by a device (e.g., device 1300 or any other devices or systems discussed herein) or portions of process 100 may be performed by a device to provide automatic perspective control. Process 100 or portions thereof may be repeated for any number input images, pictures, frames of video, or the like. For example, process 100 may provide for images having a constructed perspective and more desirable appearance for a user.

As shown, process 100 may begin at operation 101, "Receive Input Image", where an input image may be received. The input image may be any suitable input image and the input image may be received from any suitable source.

Figure 2:
FIG. 2 illustrates an example input image.

FIG. 2 illustrates an example input image 200, arranged in accordance with at least some implementations of the present disclosure. As discussed, input image 200 may include any suitable image, picture, or frame of video or the like or any suitable data representing an image, picture, or frame of video. For example, input image 200 may include any suitable image or imaging data. In some examples, input image 200 may be received from an image sensor, an image signal processor, or the like. Input image 200 may be in any suitable format and/or color space. For example, input image 200 may include pixel values for each pixel of an image and the pixel values may be provided for each channel of a color space such as the RGB (red green blue) color space, the YUV (Y luminance, U chroma, and V chroma) color space, or the like. Furthermore, input image 200 may include values for any number of pixels for any number or types of input image(s). For example, input image 200 may include a static image, an image frame of a video sequence, portions thereof (e.g., a slice or section of an image), or the like.

In the illustrated example, input image 200 includes an image of a scene including a cityscape. The discussed techniques may be advantageously provided to images of buildings, monuments, cityscapes, and the like. However, input image 200 may include an image of any suitable scene including any suitable subjects. In some embodiments, input image 200 may include an image of a document, a sign, or the like and the discussed techniques may provide for image rectification of input image 200.

Returning to FIG. 1, processing may continue at operation 102, "Detect Edges", where edges, corners, lines or the like may be detected within the input image. The edges, corners, lines, or the like within the input image may be detected using any suitable technique or techniques. For example, pixels within the input image corresponding to meaningful features such as edges, corners, lines, or the like may typically show strong contrast with respect to neighboring pixels. In some embodiments, detecting the edges, corners, lines or the like within the input image may include applying a Canny edge detector or other edge detector to detect such pixels and thereby detect edges, corners, lines, or the like. In some embodiments, detecting the edges may include generating an edge image. The edge image may include any suitable data associated with an edge image such as a binary edge image data or the like. For example, a binary edge image may include pixel values of 1 or 255 or the like for pixels detected as edge, corner, or line pixels, or the like and pixel values of 0 for pixels that are not indicative of such edges, corners, lines, or the like.

Figure 3:
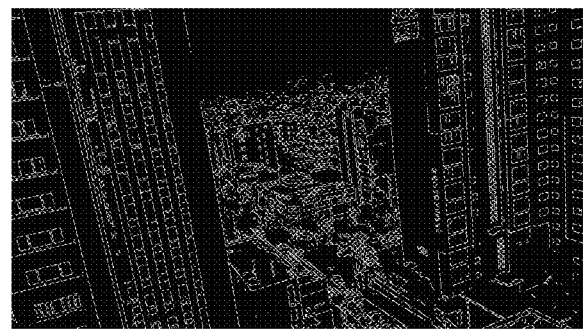
FIG. 3 illustrates an example edge image.

FIG. 3 illustrates an example edge image 300, arranged in accordance with at least some implementations of the present disclosure. As discussed, edge image 300 may include any suitable data representative of edges, corners, lines or the like within the input image (e.g., input image 200). As shown, in some embodiments, edge image 300 may be a binary edge image including pixel values of 1 (illustrated as white in FIG. 3) for pixels detected as edge, corner, or line pixels, or the like and pixel values of 0 (illustrated as black in FIG. 3) for pixels that are not indicative of such edges, corners, lines, or the like.

Returning to FIG. 1, processing may continue at operation 103, "Detect Lines", where lines may be detected based on the edge image and line data may be generated. Lines may be detected at operation 103 using any suitable technique or techniques. In some embodiments, a line detector may be applied to the edge image to generate the detected lines and/or line data. For example, the line detector may apply a transform such as a Hough transform (HT) or the like to generate a transform map such as a Hough transform map. For example, the transform may convert the edge image to a transform map that includes every possible line (e.g., candidate line) in the edge image (and the input image) and the number of edge pixels that the possible line passes through or near.

In some embodiments, the detected lines may include the lines of the transform map (e.g., the candidate lines) having the most edge pixels associated therewith. For example, the detected lines may include a particular number of lines (e.g., 100 lines or the like) having the most edge pixels associated therewith. Furthermore, in some embodiments, a threshold may be applied such that the detected lines must have more than a threshold number of edge pixels associated therewith. For example, the detected lines may include up to a threshold number of lines having at least a threshold number of edge pixels associated therewith. Such techniques may provide simplicity of implementation and relatively high quality results with respect to the detected lines. However, such techniques may provide redundant lines in the detected lines particularly in areas densely populated with edges due in part to discretized pixel sizes.

In other embodiments, the detected lines may be determined based on a recursive line selection and decremental transform technique.

Figure 4:
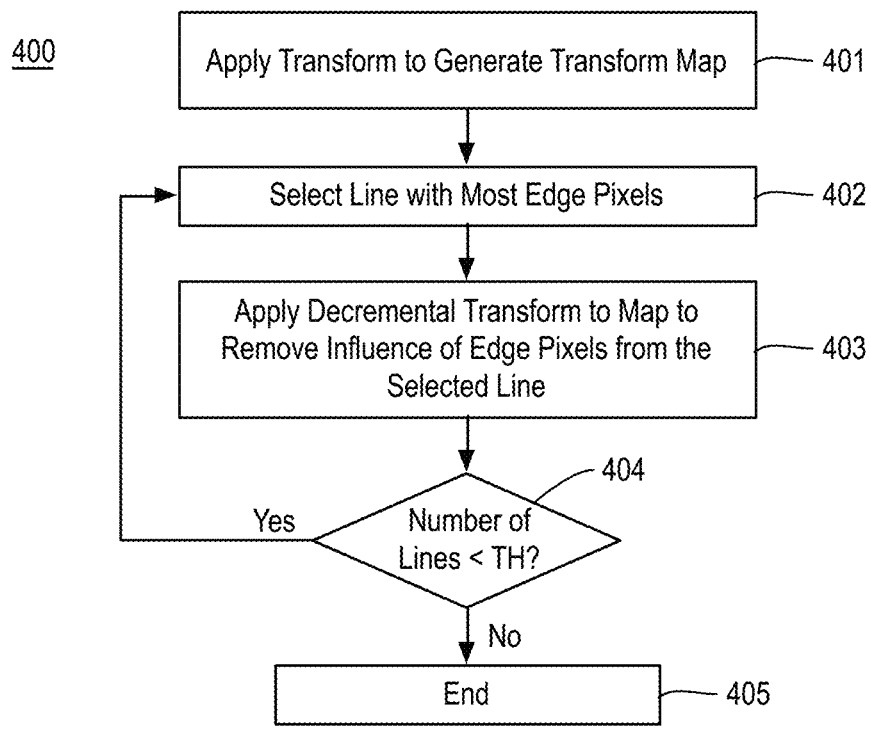
FIG. 4 illustrates an example process for detecting lines based on an edge image.

FIG. 4 illustrates an example process 400 for detecting lines based on an edge image, arranged in accordance with at least some implementations of the present disclosure. Process 400 may include one or more operations 401-405 as illustrated in FIG. 4. In some embodiments, process 400 may be performed via operation 103 of process 100.

As shown, process 400 may begin at operation 401, "Apply Transform to Generate Transform Map", where a transform may be applied to an edge image to generate a transform map. The transform may be applied using any suitable technique or techniques and may include any suitable transform such as a Hough transform or the like. As discussed, the transform map may include candidate lines and the number of edge pixels that the candidate lines pass through or near.

Processing may continue at operation 402, "Select Line with Most Edge Pixels", where a line with a greatest number of edge pixels associated therewith may be selected and included in the detected lines. For example, the line with a greatest number of edge pixels associated therewith may include a high confidence of being a valid line. In some embodiments, operation 402 may include applying a threshold such that the selected line must have at least a threshold number of edge pixels associated therewith. If no such line exists (e.g. based on the threshold not being met), processing may continue to end operation 405.

Processing may continue at operation 403, "Apply Decremental Transform to Map to Remove Influence of Edge Pixels from the Selected Line", where a decremental transform may be applied to the transform map to generate another (e.g., decremented) transform map to remove edge pixel contributions of edge pixels associated with the line selected at operation 402. The decremental transform may be applied using any suitable technique or techniques. In some embodiments the decremental transform may be a decremental Hough transform.

Processing may continue at decision operation 404, "Number of Lines <TH?", where a determination may be made as to whether the number of detected lines is less than a threshold. The threshold may be applied using any suitable technique or techniques and may include any suitable number of lines (e.g., 100 or the like) to limit the number of detected lines. For example, the threshold applied at operation 404 and the optional threshold applied at operation 402 may limit the detected lines to high quality lines.

If the threshold has not been met, processing may continue at operations 402 and 403 as discussed where subsequent detected lines may be selected until the threshold applied at operation 404 or the optional threshold applied at operation 402 is met. If the threshold has been met, processing may end at end operation 405. As discussed, process 400 or other techniques may be implemented to detect lines within an edge image.

Figure 5:
FIG. 5 illustrates an example image including example detected lines.

FIG. 5 illustrates an example image 500 including example detected lines 501, arranged in accordance with at least some implementations of the present disclosure. As shown, detected lines 501 may correspond to edges or lines of input image 200. Detected lines 501 may be represented using any suitable data structure. As is discussed further herein, detected lines 501 may be used to generate one or more vanishing points and to align and/or warp image 500.

Returning to FIG. 1, processing may continue at operation 104, "Determine Vanishing Points", where vanishing points may be determined based on the lines detected at operation 103. The vanishing points, if any, may be detected using any suitable technique or techniques. For example, all parallel lines in the real world should meet at a point (e.g., a vanishing point) in an image space (e.g., associated with the input image) and vanishing points may be found based on such intersections. In some embodiments, determining the vanishing points may include determining intersection points of substantially parallel lines (e.g., nearly parallel lines) determined at operation 103.

However, due to errors from discretized pixel sizes and the like, such intersections may not all meet at a point or points and such errors may increase for vanishing points far from a center of the image. Therefore, in some embodiments, intersection points may be clustered in an image space of the input image by dividing the image space into 2-dimensional bins such as angular and radial bins. Based on determining intersection points for each pair of detected lines, counts in the corresponding bins may be determined. After all the intersections are determined, the bin or bins with most intersections (e.g., highest count) may indicate the direction to or a location of a vanishing point. In some embodiments, a threshold (e.g., a minimum number of intersection) may be set such that only valid vanishing points may be obtained. As discussed herein, vanishing points that are inside the image frame or region may be discarded or ignored as unsuitable for perspective correction. Furthermore, once the vanishing point or points are determined, the lines (e.g., detected lines) that meet at the corresponding bin (e.g., vanishing point) may be marked as valid lines and coupled to or associated with the vanishing point. For example, such valid lines or a subset thereof may be used for subsequent image processing. In some embodiments, all vanishing points may be used for correcting perspectives in each direction. In some embodiments, the vanishing point closest to the vertical axis may be selected and used to provide image rotation and warping to provide an automated process.

Figure 6:
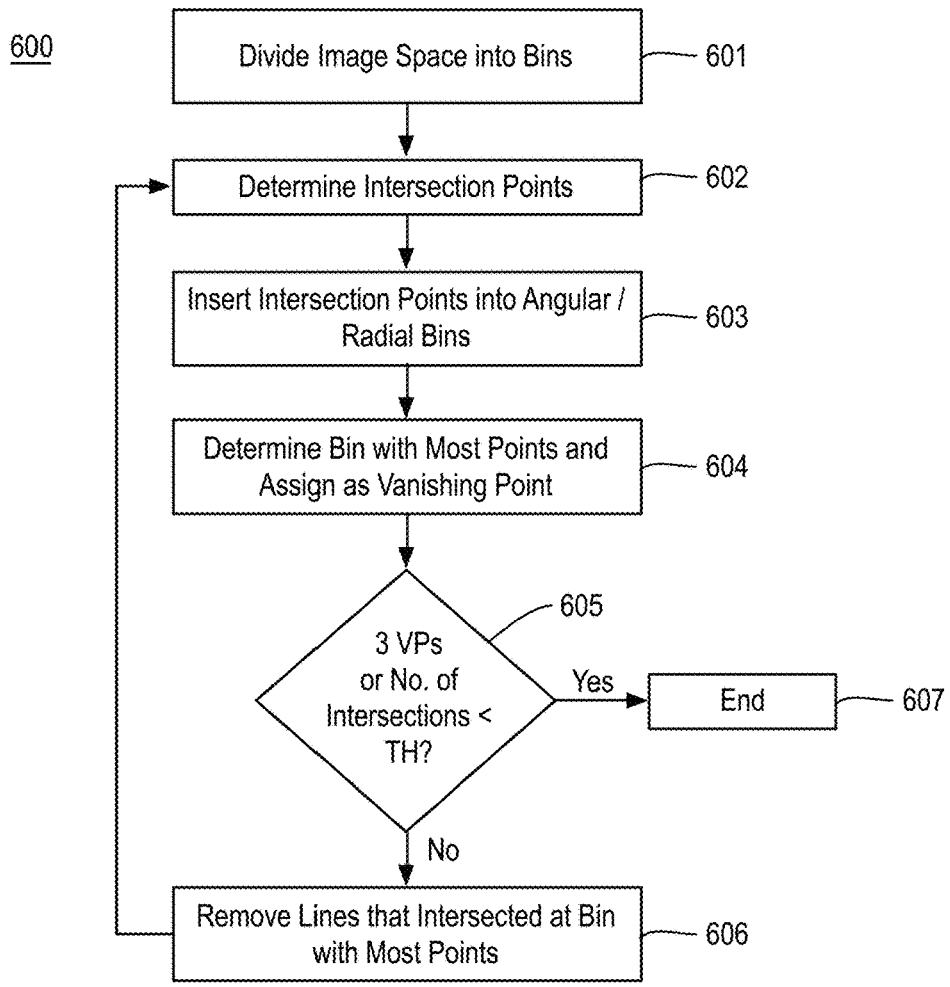
FIG. 6 illustrates an example process for determining vanishing points based on detected lines.

FIG. 6 illustrates an example process 600 for determining vanishing points based on detected lines, arranged in accordance with at least some implementations of the present disclosure. Process 600 may include one or more operations 601-607 as illustrated in FIG. 6. In some embodiments, process 600 may be performed via operation 104 of process 100.

As shown, process 600 may begin at operation 601, "Divide Image Space into Bins", where an image space associated with the input image may be divided into bins or tiles or the like. The image space may be divided into bins using any suitable technique or techniques and the bins may have any suitable size(s) and shape(s).

Figure 7:
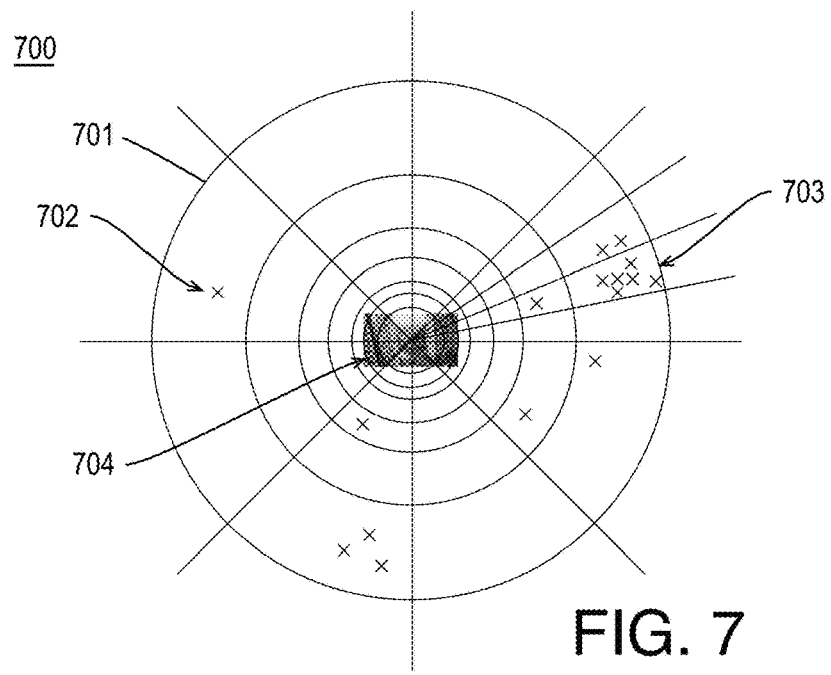
FIG. 7 illustrates an example image space divided into example bins.

FIG. 7 illustrates an example image space 700 divided into example bins 701, arranged in accordance with at least some implementations of the present disclosure. As shown, image space 700 may include image frame 704 (e.g., the area of the input image) and image space 700 may extend beyond image frame 704 to any suitable size. Furthermore, image space 700 may be divided into bins 701 (only one bin is labeled in FIG. 7 for the sake of clarity of presentation) having any suitable size(s) and shape(s). Furthermore, in FIG. 7, some bins are not fully illustrated (e.g., more granularity of divisions may be provided with respect to all bins as shown with respect to a selected bin 703) for the sake of clarity of presentation. In the illustrated example, bins 701 are 2-dimensional angular and radial bins (e.g., segments of annuli) having larger sizes proportional to their distance from a center of image frame 704. In other embodiments, bins 701 may be provided via a square or rectangular grid or any other suitable shape.

Returning to FIG. 6, processing may continue at operation 602, "Determine Intersection Points", where intersection points among the detected lines may be determined. The intersection points may be determined using any suitable technique or techniques. In some embodiments, intersections among only lines generally having similar direction may be determined (e.g., the intersection of lines running in perpendicular directions may not be of interest for generating vanishing points). Furthermore, as discussed herein, in some embodiments, vanishing points within image frame 704 may not be of interest. In such embodiments, intersections within image frame 704 may be discarded.

Processing may continue at operation 603, "Insert Intersection Points into Bins", where the intersection points determined at operation 602 may be inserted into their associated bins. The intersection points may be inserted into their associated bins using any suitable technique or techniques. For example, an intersection point may be determined to be within the boundaries of a particular bin and then inserted into the bin or a bin count of the bin may be increased based on the intersection point being with the boundaries of the bin or the like. Referring to FIG. 7, as shown, example intersection point 702 may be inserted into example bin 701. In FIG. 7, only one intersection point is labeled for the sake of clarity of presentation. However, any number of intersection points may be inserted into their respective bins at operation 603.

Returning to FIG. 6, processing may continue at operation 604, "Determine Bin with Most Points and Assign as Vanishing Point", where a bin with the most intersection points may be determined and a location associated with the bin may be assigned as a vanishing point. The bin with the most intersection points may be determined and the location associated with the bin may be assigned using any suitable technique or techniques. Referring to FIG. 7, as shown, selected bin 703 may have the most intersection points with respect to bins 701. A location in image space 700 (e.g., a center of selected bin 703 or the like) may be assigned as a vanishing point based on the bin having the most intersection points. Furthermore, the lines associated with the intersection of points in selected bin 703 may be marked or labeled as valid lines or the like and associated with the assigned vanishing point.

Returning to FIG. 6, processing may continue at decision operation 605, "3 VPs or No. of Intersections <TH?", where a determination may be made as to whether three vanishing points have been assigned or the number of intersections is less than a threshold. If either is true, processing may continue at end operation 607. For example, only three vanishing points may be theoretically available for an image and, if that number is reached, no further processing may be needed. Furthermore, if the number of intersections is less than a threshold, no additional valid vanishing points may be determined For example, such a threshold may provide for only high confidence vanishing points via process 600.

If neither is true, processing may continue at operation 606, "Remove Lines that Intersected at Bin with Most Points", where the lines that intersected at the bin with the most intersection points (e.g. the lines marked or labeled as discussed) may be removed and processing may continue at operations 602-605 as discussed until the maximum number of vanishing points is reached or a number of intersections is less than a threshold. For example, intersection points of the remaining lines may be determined or recalled from memory, inserted into bins, and a bin with the most intersection points associated therewith may be provided as or associated with a vanishing point as discussed herein.

Figure 8:
FIG. 8 illustrates an example image including example valid lines.

FIG. 8 illustrates an example image 800 including example valid lines 801 and valid lines 802, arranged in accordance with at least some implementations of the present disclosure. As discussed, valid lines may be those lines that are associated with a vanishing point. In FIG. 8, valid lines 801 (e.g., lines running substantially vertically and from up-left to down-right) may be associated with a vanishing point below image 800 and valid lines 802 (e.g., lines running substantially horizontally and from down-left to up-right) may be associated with a vanishing point to the right of image 800. Some of such valid lines 801, 802 may be used for subsequent image processing such as image warping or the like as discussed herein.

Returning to FIG. 1, processing may continue at decision operation 105, "Valid VP Found?", where a determination may be made as to whether one or more valid vanishing points have been determined or found. If not, processing may continue at operation 108, "Provide Output Image", where no additional processing (e.g., image manipulation) may be provided and the input image may be provided as the output image. For example, when no valid vanishing point is found, no perspective control may be provided. In some such examples, the input image may not include a scene with subjects having lines.

If one or more valid vanishing points have been determined, processing may continue at operation 106, "Rotate Image to Upright", where the input image may be rotated to upright. The input image may be rotated to upright using any suitable technique or techniques. For example, rotating the image to upright may generate an aligned image as discussed herein. In some embodiments, the image rotation may include rotating the input image about its center to bring a selected vanishing point toward or to a vertical axis of the input image. In some embodiments, a single valid vanishing point may be available for such processing as discussed herein. In such embodiments the single valid vanishing point may be tested for nearness to a vertical axis of the input image and, if the single valid vanishing point is less than a threshold distance from the vertical axis, the image may be rotated by rotating the image about its center such that the rotation that brings the single valid vanishing point to the vertical axis.

In other embodiments, multiple valid vanishing points may be available. In such embodiments, a vanishing point from the multiple valid vanishing points nearest the vertical axis may be determined and optionally tested for nearness to the vertical axis. Based on the selected vanishing point, the image may be rotated by rotating the image about its center such that the rotation that brings the single valid vanishing point to the vertical axis.

For example, rotating the image may include determining an angle between a line connecting a center of the image to the selected vanishing point and the vertical axis and rotating the image by the determined angle. Such an angle may indicate how much a camera was rotated along a viewing direction when the input image was captured, for example, and rotating the image may include rotating the image by the angle to provide a level horizon. As discussed, in some embodiments rotating the image may include rotating a vanishing point to a vertical axis. In other embodiments, rotating the image may include rotating a vanishing point to a horizontal axis of the image.

Figure 9:
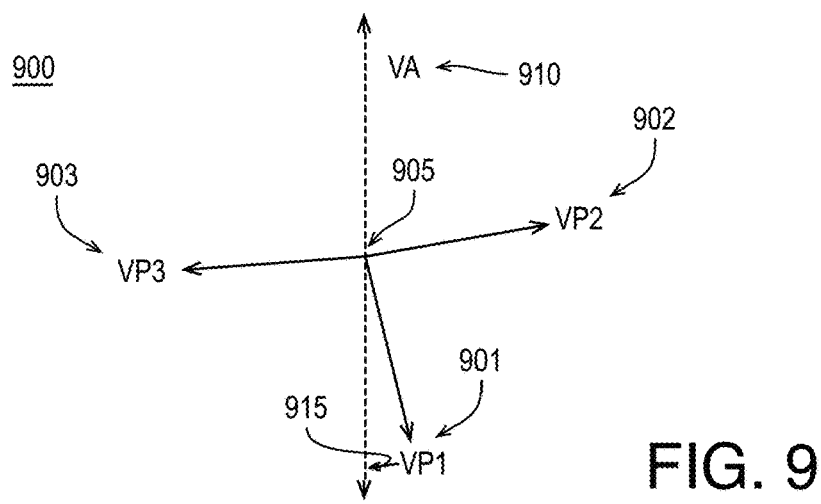
FIG. 9 illustrates an example image space including a vertical axis and example vanishing points.

FIG. 9 illustrates an example image space 900 including a vertical axis 910 and example vanishing points 901, 902, 903, arranged in accordance with at least some implementations of the present disclosure. As discussed, an input image may have zero, one, two, or three valid vanishing points and the input image may be rotated based on a valid vanishing point to generate an aligned image. In the illustrated example, image space 900 includes three vanishing points 901, 902, 903. In such example and examples with two vanishing points, a selected vanishing point of vanishing points 901-903 may be determined as a vanishing point nearest to vertical axis 910. In the illustrated example, vanishing point 901 is nearest the vertical axis. In examples with only one valid vanishing points, the only valid vanishing point may be selected. Furthermore, the selected vanishing point 901 may be optionally tested for nearness to vertical axis 910 using any suitable technique or techniques. For example, the absolute value of the horizontal distance of the selected vanishing point from vertical axis 910 may be compared to a threshold or an angle between vertical axis 910 and a line connecting a center 905 of image space 900 to vanishing point 901 may be compared to threshold or the like.

If a valid vanishing point is determined such that a valid rotation of the input image may be made. For example, the input image may be rotated by a rotation 915 that brings the valid vanishing point (e.g., vanishing point 901 in FIG. 9) to or close to vertical axis 910. In the illustrated example, vanishing point 901 may be characterized as a nadir vanishing point (e.g., a vanishing point below a horizontal horizon). In other example, the vanishing point used for rotation and warping may be a zenith vanishing point (e.g., a vanishing point above a horizontal horizon).

Figure 10:
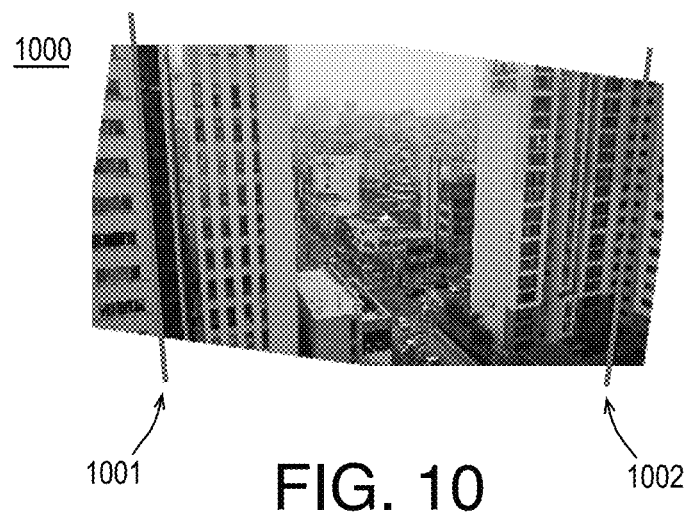
FIG. 10 illustrates an example aligned image.

FIG. 10 illustrates an example aligned image 1000, arranged in accordance with at least some implementations of the present disclosure. As shown, aligned image 1000 may have an improved vertical alignment with respect to input image 200 (please refer to FIG. 2). FIG. 10 also illustrates outer lines 1001, 1002, which are discussed further herein below.

Returning to FIG. 1, processing may continue at operation 107, "Warp Image", where the aligned image generated at operation 106 may be warped to provide perspective control. The aligned image may be warped using any suitable technique or techniques. For example, a perspective may be corrected by making parallel lines in the real world also parallel in the output (e.g. warped) image. In some embodiments, two outer most lines that meet at the selected vanishing point may be determined A homographic mapping may be generated based on aligning the two outer most lines to parallel or nearly parallel and the homographic mapping may be applied to the aligned image. For example, the homographic mapping may be based on the four end points of the two outer most lines and the target positions (e.g., positions that rotate the two outer most lines to parallel) of the four end points. In some embodiments, the homographic mapping may provide for the two outer most lines to go to parallel as discussed. In other embodiments, the homographic mapping may provide for the two outer most lines to move toward but not fully to parallel (e.g., half way to parallel, a percentage to parallel, or the like). For example, a threshold rotation of the outer most lines may be provided such that the homographic mapping must provide a rotation less than the threshold. Such targeting may control the amount of correction and may provide a more desirable (e.g., less warped) perspective controlled image in some contexts. As discussed, in some embodiments, two outer most lines of the lines that meet at the selected vanishing point (e.g., valid lines) may be used to provide the image warping. However, any lines that meet at the selected vanishing point (e.g., valid lines) may be used to provide the image warping.

Processing may continue at operation 108, "Provide Output Image", where an output image may be provided using any suitable technique or techniques. For example, the output image may be the rotated and/or warped image as discussed herein. The output image may be characterized as a processed image, a perspective controlled image, a rectified image, or the like. In some embodiments, the output image may be presented to a user via a display. In addition or in the alternative, the output image may be saved to memory and/or transmitted to a remote device.

Figure 11:
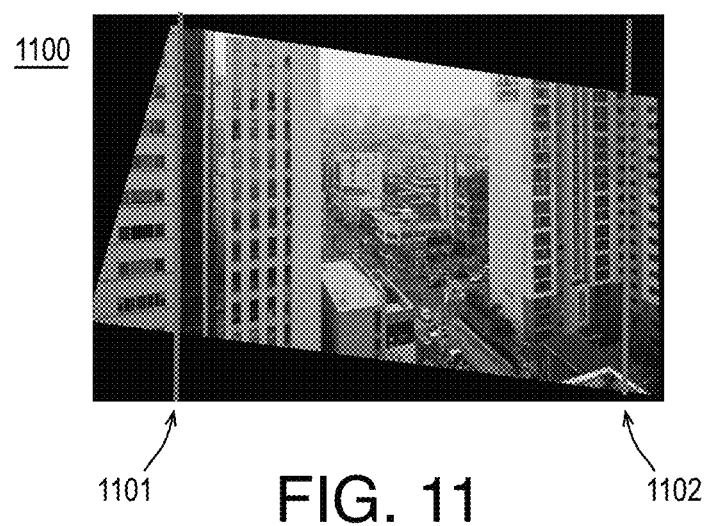
FIG. 11 illustrates an example perspective controlled image.

FIG. 11 illustrates an example perspective controlled image 1100, arranged in accordance with at least some implementations of the present disclosure. As shown, perspective controlled image 1100 may have an improved visual appearance with respect to input image 200 (please refer to FIG. 2) such that an expected and desirable constructed perspective is attained.

With reference to FIGS. 10 and 11, as shown, outer lines 1001, 1002 may be rotated to substantially parallel outer lines 1101, 1102 via the image warping performed at operation 107. As discussed, in other embodiments, lines other than outer lines 1001, 1002 may be used to warp the aligned image (e.g., any lines that meet at the selected vanishing point). Furthermore, outer lines 1001, 1002 may be rotated to fully parallel or partially parallel as discussed herein.

Figure 12:
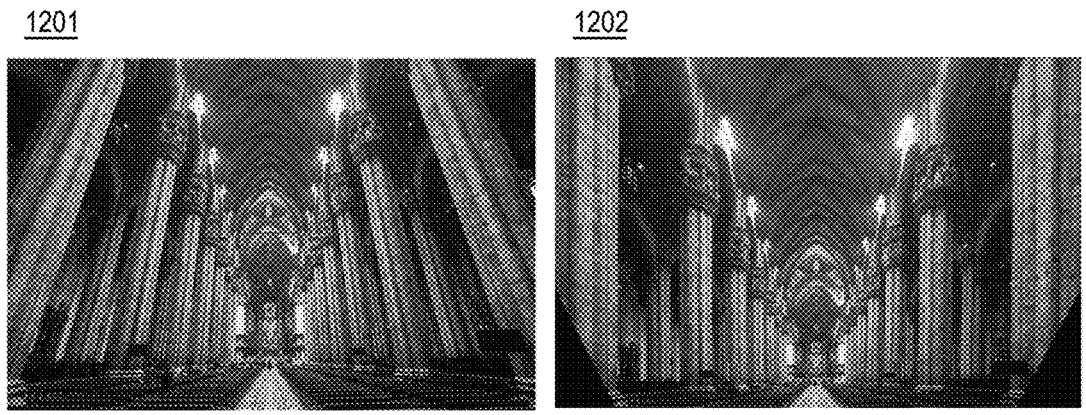
FIG. 12 illustrates an example input image and an example perspective controlled image.

FIG. 12 illustrates an example input image 1201 and an example perspective controlled image 1202, arranged in accordance with at least some implementations of the present disclosure. As shown, perspective controlled image 1202 may have an improved visual appearance with respect to input image 1201 such that an expected and desirable constructed perspective is attained for the building scene represented by perspective controlled image 1202.

For example, the discussed techniques may provide for a perspective controlled image having a desirable constructed perspective based on an input image that has undesirable distortion. For example, man-made structures may include many parallel straight lines. As discussed herein, such straight lines may provide visual cues for detecting perspective in an input image. Since a set of parallel lines in the real world meet at a vanishing point in a space associated with the input image, lines detected in the input image may be classified into perspective groups based on their associated vanishing points, which may be determined as discussed herein. By selecting two lines in a perspective group (e.g., outer most lines or the like) and applying a transform or morphing to make the lines parallel, perspective control of the input image may be automatically provided without user intervention.

Furthermore, as discussed, there may be, in theory, up to three vanishing points in an image. Such vanishing points may be classified as internal and external vanishing points such that internal vanishing points are those imaged inside an image frame and external vanishing points are those outside of the image frame. Internal vanishing points, as discussed, may not be used for correcting perspectives because of large distortions associated therewith. External vanishing points may be used for correcting perspective either in the vertical or horizontal direction or both. As discussed herein, in some embodiments, only the vanishing point in the vertical direction (e.g., nearest to a vertical axis of the image) may be used for automatic perspective control because vertical perspective is the most common problem in the input images. By rotating the image based on the angle between the direction to the vertical vanishing point and vertical axis, the input image may be automatically aligned such that the actual (e.g., real world) lines are aligned with the image coordinates. Furthermore, the aligned image may be warped to provide a desirable constructed perspective based on aligning toward or to parallel two lines (e.g., two outer most lines) associated with the vertical vanishing point.

Figure 13:
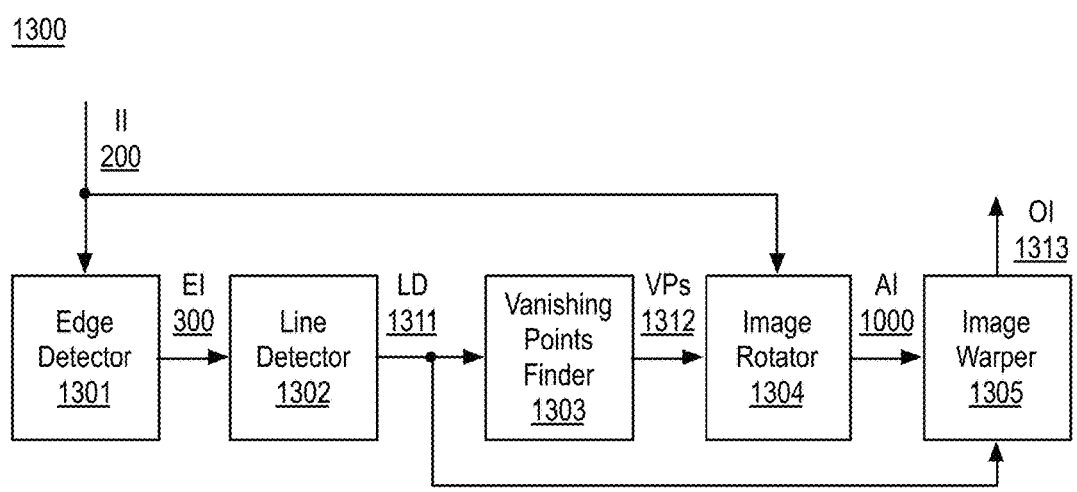
FIG. 13 illustrates an example device for providing automatic perspective control for an image.

FIG. 13 illustrates an example device 1300 for providing automatic perspective control for an image, arranged in accordance with at least some implementations of the present disclosure. As shown in FIG. 13, device 1300 may include an edge detector 1301, a line detector 1302, a vanishing points finder 1303, an image rotator 1304, and an image warper 1305. In some embodiments, device 1300 may include a camera and/or a display for capturing image data and/or presenting image data, respectively. Device 1300 may perform any technique or techniques as discussed herein.

As shown, device 1300 may capture or receive an input image (II) 200. In some embodiments, device 1300 may capture input image 200 via a camera and/or image preprocessor or the like. In other embodiments, device 1300 may receive input image 200 via a memory or remote device or the like. As used herein, the term camera may include any device capable of capturing an image or image data and/or any associated circuitry for generating such an image or image data such as an image processor or the like. For example, a camera may be characterized as an imaging device or the like.

Device 1300 may be any suitable form factor device such as a computer, a laptop computer, a tablet, a smart phone, a phablet, a digital camera, a gaming console, a wearable device, a display device, a personal computer system, a cloud computing system, or the like. As discussed, in some examples, device 1300 may include a camera (not shown), a display (not shown), edge detector 1301, line detector 1302, vanishing points finder 1303, image rotator 1304, and image warper 1305. In such contexts, device 1300 may capture images, provide automatic perspective control, and/or display the image to a user. In other examples, device 1300 may not include one or both of a camera and a display.

As discussed, device 1300 may capture input image 200 and/or device 1300 may receive input image 200 for processing. Input image 200 may include any suitable image, picture, or frame of video or the like or any suitable data representing an image, picture, or frame of video as discussed herein.

Edge detector 1301 may receive input image 200 and edge detector 1301 may detect edges, corners, lines, or the like within input image 200 to generate an edge image (EI) 300. Edge detector 1301 may generate edge image 300 using any suitable technique or techniques such as those discussed herein. In some embodiments, edge detector 1301 may apply a Canny edge detector or other edge detector to detect such pixels and thereby detect as edges, corners, lines, or the like to generate edge image 300. Edge image 300 may include any suitable data associated with an edge image such as a binary edge image.

Line detector 1302 may receive edge image 300 and line detector 1302 may detect or determine lines to generate line data (LD) 1311. Line detector 1302 may generate line data 1311 using any suitable technique or techniques such as those discussed herein. In some embodiments, line detector 1302 may apply a transform such as a Hough transform (HT) or the like to generate a transform map such as a Hough transform map. For example, the transform map may include every possible line (e.g., candidate line) in edge image 300 (and input image 200) and the number of edge pixels that the possible line passes. In some embodiments, line data 1311 may include the lines of the transform map having the most edge pixels (e.g., votes) associated therewith. For example, line data 1311 may include a particular number of lines (e.g., 100 lines or the like) having the most edge pixels associated therewith. In some embodiments, a threshold may be applied such that the lines in line data 1311 must have more than a threshold number of edge pixels associated therewith.

In other embodiments, line data 1311 may include lines detected using techniques as discussed with respect to process 400. For example, line data 1311 may include a first line having the most edge pixels associated therewith. Then, a decremental transform may be applied to the transform map to remove edge pixel contributions of edge pixels associated with the first line to generate another (e.g., decremented) transform map. Another line having the most edge pixels associated therewith in the decremented transform map may be included in line data 1311, the transform map may again be decremented and so on until a particular number of lines (e.g., 100 lines or the like) are included in line data 1311. Such techniques may provide a more regularly distributed set of lines.

As shown in FIG. 13, vanishing points finder 1303 may receive line data 1311 and vanishing points finder 1303 may generate one or more vanishing points (VPs) 1312 based on line data 1311. Vanishing points finder 1303 may generate vanishing points 1312 using any suitable technique or techniques such as those discussed herein. In some embodiments, vanishing points finder 1303 may determine vanishing points 1312 based on intersections of the detected lines represented by line data 1311. In other embodiments, vanishing points finder 1303 may determine vanishing points 1312 using techniques as discussed with respect to process 600. For example, vanishing points finder 1303 may cluster intersection points by dividing the image space (e.g., including the space extending beyond the image frame) into bins. For example, the bins may be 2-dimensional angular and radial bins as discussed further herein. The intersections among lines of line data 1311 may be inserted into their associated bins and the bin with the most intersections may be selected as corresponding to a vanishing point. In some embodiments, the number of intersections may be required to exceed a threshold to qualify as a valid vanishing point. In some embodiments, a vanishing point within the image frame may be discarded since it is not useful for perspective correction. Furthermore, vanishing points 1312 may include the lines associated with the vanishing point and marked as valid perspective correction lines as discussed herein.

Vanishing points 1312 may include zero, one, two, or three vanishing points. In examples where vanishing points 1312 include zero vanishing points, input image 200 may be provided as output image 1313 (e.g., no further image processing may be performed).

In examples where vanishing points 1312 include one or more valid vanishing points, image rotator 1304 may receive vanishing points 1312 and input image 200 and image rotator 1304 may rotate input image 200 to provide aligned image 1000. Image rotator 1304 may rotate input image 200 using any suitable technique or techniques. For example, image rotator 1304 may rotate input image 200 using any techniques discussed with respect to operation 106. In some embodiments, the vanishing point used for rotation (e.g., a perspective control vanishing point selected from vanishing points 1312) may be determined by image rotator 1304 and, in other embodiments, the vanishing point used for rotation may be determined by vanishing points finder 1303. In some embodiments, image rotator 1304 may rotate input image 200 by rotating input image 200 about its center to bring a selected vanishing point (e.g., a perspective control vanishing point) toward or to a vertical axis of the input image.

As shown, image warper 1305 may receive aligned image 1000 and line data 1311 and image warper 1305 may warp aligned image 1000 to generate output image 1313. Image warper 1305 may warp aligned image 1000 using any suitable technique or techniques such as those discussed herein. In some embodiments, image warper 1305 may determine two outer most lines that meet at the perspective control vanishing point, generate a homographic mapping based on aligning the two outer most lines to parallel or nearly parallel, and apply the homographic mapping to aligned image 1000 to generate output image 1313. For example, the homographic mapping may be based on the four end points of the two outer most lines and target positions (e.g., positions that rotate the two outer most lines to parallel) of the four end points. In some embodiments, the homographic mapping may provide for the two outer most lines to go to parallel and, in other embodiments, the homographic mapping may provide for the two outer most lines to move toward but not fully to parallel. Furthermore, in some embodiments, two outer most lines of the lines that meet at the selected vanishing point (e.g., valid lines) may be used to provide the image warping. However, any lines that meet at the selected vanishing point (e.g., valid lines) may be used to provide the image warping. Output image 1313 may include any suitable image data such as image data discussed with respect to input image 200. Output image 1313 may be presented to a user via a display, saved to memory, transmitted to another device, or the like.

Figure 14:
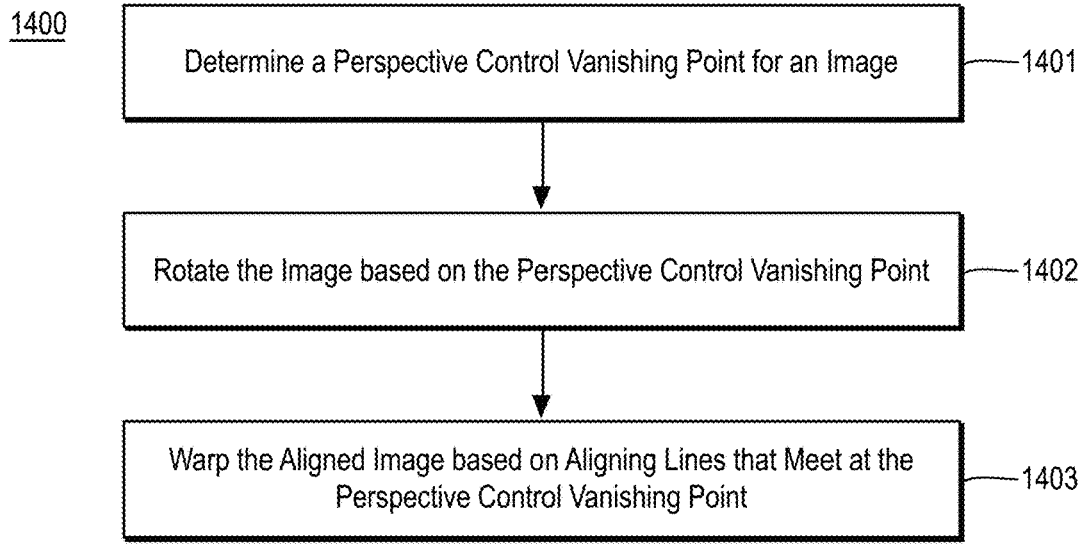
FIG. 14 is a flow diagram illustrating an example process for providing automatic perspective control for an image.

FIG. 14 is a flow diagram illustrating an example process 1400 for providing automatic perspective control for an image, arranged in accordance with at least some implementations of the present disclosure. Process 1400 may include one or more operations 1401-1403 as illustrated in FIG. 14. Process 1400 may form at least part of an automatic perspective control process. By way of non-limiting example, process 1400 may form at least part of an automatic perspective control process as performed by device 1300 as discussed herein. Furthermore, process 1400 will be described herein with reference to system 1500 of FIG. 15.

Figure 15:
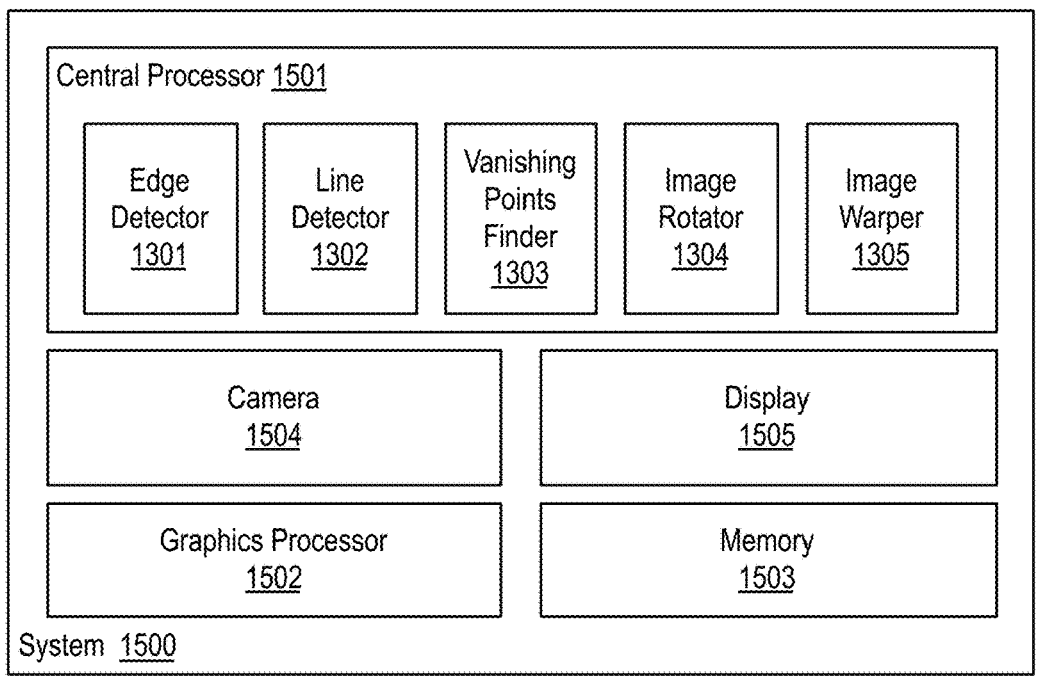
FIG. 15 is an illustrative diagram of an example system for providing automatic perspective control for an image.

FIG. 15 is an illustrative diagram of an example system 1500 for providing automatic perspective control for an image, arranged in accordance with at least some implementations of the present disclosure. As shown in FIG. 15, system 1500 may include a central processor 1501, a graphics processor 1502, a memory 1503, a camera 1504, and a display 1505. As discussed, in some embodiments system 1500 may not include camera 1504 and/or display 1505. Also as shown, central processor 1501 may include or implement edge detector 1301, line detector 1302, vanishing points finder 1303, image rotator 1304, and image warper 1305. In the example of system 1500, memory 1503 may store image data or any related data such as input images, edge images, line data, vanishing points, valid lines, aligned images, output images, thresholds, or any other data discussed herein.

As shown, in some examples, edge detector 1301, line detector 1302, vanishing points finder 1303, image rotator 1304, and image warper 1305 may be implemented via central processor 1501. In other examples, one or more or portions of edge detector 1301, line detector 1302, vanishing points finder 1303, image rotator 1304, and image warper 1305 may be implemented via graphics processor 1002, an image processing unit, an image processing pipeline, or the like. In some examples, edge detector 1301, line detector 1302, vanishing points finder 1303, image rotator 1304, and image warper 1305 may be implemented in hardware as a system-on-a-chip (SoC).

Graphics processor 1502 may include any number and type of graphics processing units that may provide the operations as discussed herein. Such operations may be implemented via software or hardware or a combination thereof. For example, graphics processor 1502 may include circuitry dedicated to manipulate and/or analyze images obtained from memory 1503. Central processor 1501 may include any number and type of processing units or modules that may provide control and other high level functions for system 1500 and/or provide any operations as discussed herein. Memory 1503 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1503 may be implemented by cache memory. In an embodiment, one or more or portions of edge detector 1301, line detector 1302, vanishing points finder 1303, image rotator 1304, and image warper 1305 may be implemented via an execution unit (EU) of graphics processor 1502. The EU may include, for example, programmable logic or circuitry such as a logic core or cores that may provide a wide array of programmable logic functions. In an embodiment, one or more or portions of edge detector 1301, line detector 1302, vanishing points finder 1303, image rotator 1304, and image warper 1305 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 14, process 1400 may begin at operation 1401, "Determine a Perspective Control Vanishing Point for an Image", where a perspective control vanishing point associated with an image may be determined based multiple lines detected within the image. The perspective control vanishing point may be determined using any suitable technique or techniques. In some embodiments, edges may be detected within the image to generate an edge image and the multiple lines may be generated based on applying a line detection to the edge image. For example, the edges may be detected by edge detector 1301 as implemented via central processor 1501 and the line detection may be applied via line detector 1302 as implemented via central processor 1501.

The line detection may be applied using any suitable technique or techniques. In some embodiments, applying the line detection may include applying a transform to the edge image to generate a transform map and including a line with a largest number of associated edge pixels in the transform map in the plurality of lines. In some embodiments, applying the line detection may further include applying a decremental transform to the transform map to generate a second transform map and including a second line with a largest number of associated edge pixels in the second transform map in the plurality of lines. Such processing may be repeated, for example, up to a threshold number of detected lines are determined Furthermore, the perspective control vanishing point may be determined using any suitable technique or techniques. For example, the perspective control vanishing point may be determined by vanishing points finder 1303 as implemented via central processor 1501. In some embodiments, determining the perspective control vanishing point may include dividing an image space associated with the image into multiple bins, inserting individual intersection points of the multiple lines into their respective bins of the multiple bins, and determining a first vanishing point associated with a bin of the multiple bins having a largest number of intersection points. In some embodiments, the bins may be 2-dimensional angular and radial bins. In some embodiments, determining the first vanishing point may include assigning the first vanishing point only if the first vanishing point is external to a frame of the image (e.g., internal vanishing points may be discarded). In some embodiments, determining the perspective control vanishing point may further include determining at least a second vanishing point and selecting the perspective control vanishing point from the first or second vanishing points as the vanishing point from the first or second vanishing points that is closest to a vertical axis associated with the image. Furthermore, in some embodiments, lines that meet at the perspective vanishing point may be associated with the perspective vanishing point as perspective control lines. For example, as discussed with respect to operation 1403, two lines used for warping an image may include two lines such as two outer lines of the perspective control lines.

Processing may continue at operation 1402, "Rotate the Image based on the Perspective Control Vanishing Point", where the image may be rotated based on the perspective control vanishing point to generate an aligned image. The image may be rotated using any suitable technique or techniques. For example, the image may be rotated by image rotator 1304 as implemented via central processor 1501. In some embodiments, rotating the image may include rotating the image about its center to move the perspective control vanishing point to a vertical axis of the image.

Processing may continue at operation 1403, "Warp the Aligned Image based on Aligning Lines that Meet at the Perspective Control Vanishing Point", where the aligned image may be warped based on at least partially aligning two lines of the multiple lines that meet at the perspective control vanishing point to generate a perspective controlled image. For example, the two lines that meet at the perspective control vanishing point may have been labeled as valid lines as discussed herein. For example, the aligned image may be warped by image warper 1305 as implemented via central processor 1501. In some embodiments, warping the aligned image may include generating a homographic mapping based on aligning the two lines to parallel and applying the homographic mapping to the aligned image.

Process 1400 may be repeated any number of times either in series or in parallel for any number of images or the like. As discussed, process 1400 may provide for automatic perspective control of the image.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 16:
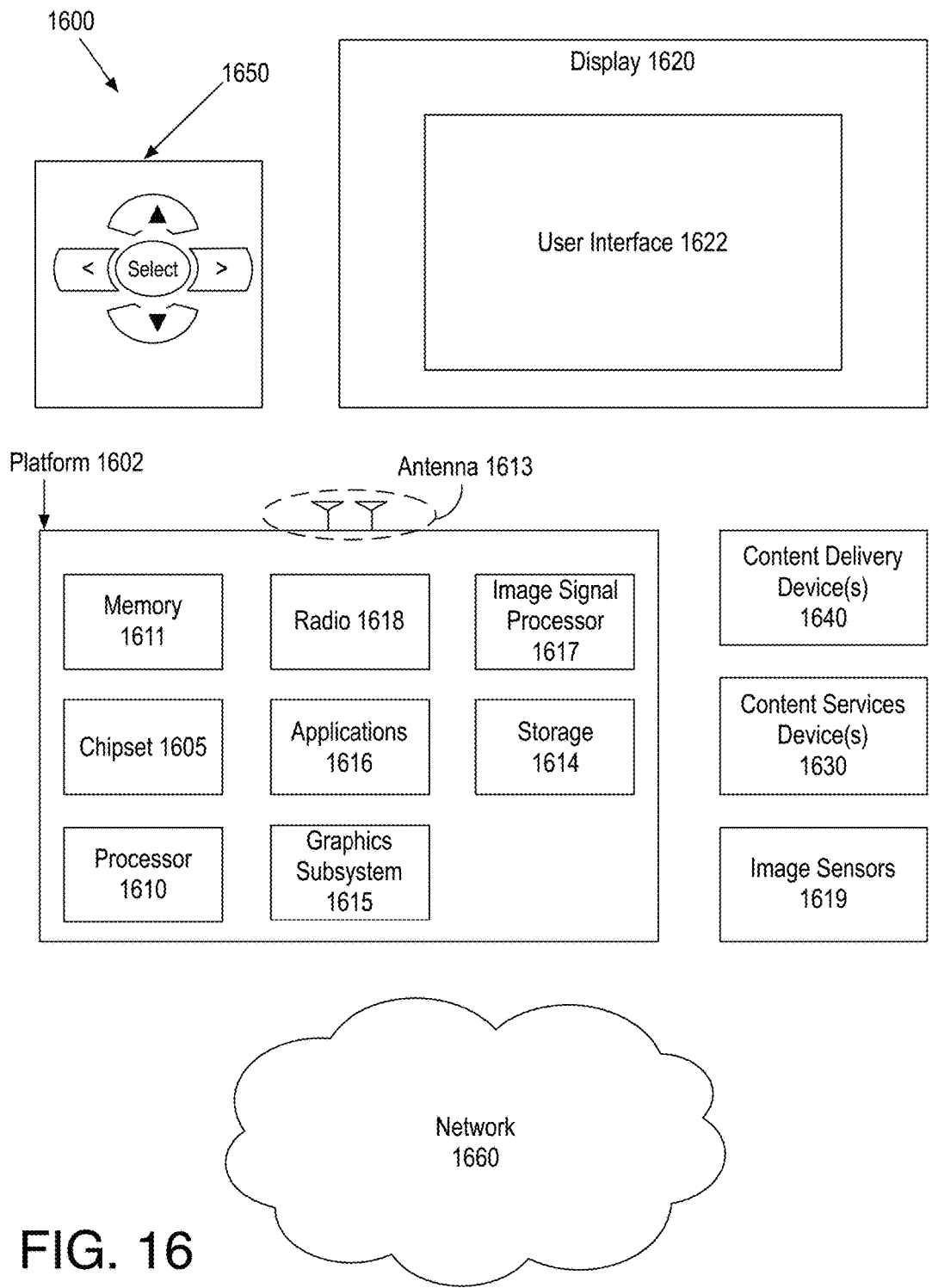
FIG. 16 is an illustrative diagram of an example system.

FIG. 16 is an illustrative diagram of an example system 1600, arranged in accordance with at least some implementations of the present disclosure. In various implementations, system 1600 may be a mobile device system although system 1600 is not limited to this context. For example, system 1600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1600 includes a platform 1602 coupled to a display 1620. Platform 1602 may receive content from a content device such as content services device(s) 1630 or content delivery device(s) 1640 or other content sources such as image sensors 1619. For example, platform 1602 may receive image data as discussed herein from image sensors 1619 or any other content source. A navigation controller 1650 including one or more navigation features may be used to interact with, for example, platform 1602 and/or display 1620. Each of these components is described in greater detail below.

In various implementations, platform 1602 may include any combination of a chipset 1605, processor 1610, memory 1611, antenna 1613, storage 1614, graphics subsystem 1615, applications 1616, image signal processor 1617 and/or radio 1618. Chipset 1605 may provide intercommunication among processor 1610, memory 1611, storage 1614, graphics subsystem 1615, applications 1616, image signal processor 1617 and/or radio 1618. For example, chipset 1605 may include a storage adapter (not depicted) capable of providing intercommunication with storage 1614.

Processor 1610 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1610 may be dual-core processor(s), dual-core mobile processor(s), and so forth.

Memory 1611 may be implemented as a volatile memory device such as, but not limited to, a Random Access Memory (RAM), Dynamic Random Access Memory (DRAM), or Static RAM (SRAM).

Storage 1614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1614 may include technology to increase the storage performance enhanced protection for valuable digital media when multiple hard drives are included, for example.

Image signal processor 1617 may be implemented as a specialized digital signal processor or the like used for image processing. In some examples, image signal processor 1617 may be implemented based on a single instruction multiple data or multiple instruction multiple data architecture or the like. In some examples, image signal processor 1617 may be characterized as a media processor. As discussed herein, image signal processor 1617 may be implemented based on a system on a chip architecture and/or based on a multi-core architecture.

Graphics subsystem 1615 may perform processing of images such as still or video for display. Graphics subsystem 1615 may be a graphics processing unit (GPU) or a visual processing unit (VPU), for example. An analog or digital interface may be used to communicatively couple graphics subsystem 1615 and display 1620. For example, the interface may be any of a High-Definition Multimedia Interface, DisplayPort, wireless HDMI, and/or wireless HD compliant techniques. Graphics subsystem 1615 may be integrated into processor 1610 or chipset 1605. In some implementations, graphics subsystem 1615 may be a stand-alone device communicatively coupled to chipset 1605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1618 may operate in accordance with one or more applicable standards in any version.

In various implementations, display 1620 may include any television type monitor or display. Display 1620 may include, for example, a computer display screen, touch screen display, video monitor, television-like device, and/or a television. Display 1620 may be digital and/or analog. In various implementations, display 1620 may be a holographic display. Also, display 1620 may be a transparent surface that may receive a visual projection. Such projections may convey various forms of information, images, and/or objects. For example, such projections may be a visual overlay for a mobile augmented reality (MAR) application. Under the control of one or more software applications 1616, platform 1602 may display user interface 1622 on display 1620.

In various implementations, content services device(s) 1630 may be hosted by any national, international and/or independent service and thus accessible to platform 1602 via the Internet, for example. Content services device(s) 1630 may be coupled to platform 1602 and/or to display 1620. Platform 1602 and/or content services device(s) 1630 may be coupled to a network 1660 to communicate (e.g., send and/or receive) media information to and from network 1660. Content delivery device(s) 1640 also may be coupled to platform 1602 and/or to display 1620.

Image sensors 1619 may include any suitable image sensors that may provide image data based on a scene. For example, image sensors 1619 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1619 may include any device that may detect information of a scene to generate image data.

In various implementations, content services device(s) 1630 may include a cable television box, personal computer, network, telephone, Internet enabled devices or appliance capable of delivering digital information and/or content, and any other similar device capable of uni-directionally or bi-directionally communicating content between content providers and platform 1602 and/display 1620, via network 1660 or directly. It will be appreciated that the content may be communicated uni-directionally and/or bi-directionally to and from any one of the components in system 1600 and a content provider via network 1660. Examples of content may include any media information including, for example, video, music, medical and gaming information, and so forth.

Content services device(s) 1630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1602 may receive control signals from navigation controller 1650 having one or more navigation features. The navigation features of navigation controller 1650 may be used to interact with user interface 1622, for example. In various embodiments, navigation controller 1650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1650 may be replicated on a display (e.g., display 1620) by movements of a pointer, cursor, focus ring, or other visual indicators displayed on the display. For example, under the control of software applications 1616, the navigation features located on navigation controller 1650 may be mapped to virtual navigation features displayed on user interface 1622, for example. In various embodiments, navigation controller 1650 may not be a separate component but may be integrated into platform 1602 and/or display 1620. The present disclosure, however, is not limited to the elements or in the context shown or described herein.

In various implementations, drivers (not shown) may include technology to enable users to instantly turn on and off platform 1602 like a television with the touch of a button after initial boot-up, when enabled, for example. Program logic may allow platform 1602 to stream content to media adaptors or other content services device(s) 1630 or content delivery device(s) 1640 even when the platform is turned "off." In addition, chipset 1605 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1600 may be integrated. For example, platform 1602 and content services device(s) 1630 may be integrated, or platform 1602 and content delivery device(s) 1640 may be integrated, or platform 1602, content services device(s) 1630, and content delivery device(s) 1640 may be integrated, for example. In various embodiments, platform 1602 and display 1620 may be an integrated unit. Display 1620 and content service device(s) 1630 may be integrated, or display 1620 and content delivery device(s) 1640 may be integrated, for example. These examples are not meant to limit the present disclosure.

In various embodiments, system 1600 may be implemented as a wireless system, a wired system, or a combination of both. When implemented as a wireless system, system 1600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 16.

Figure 17:
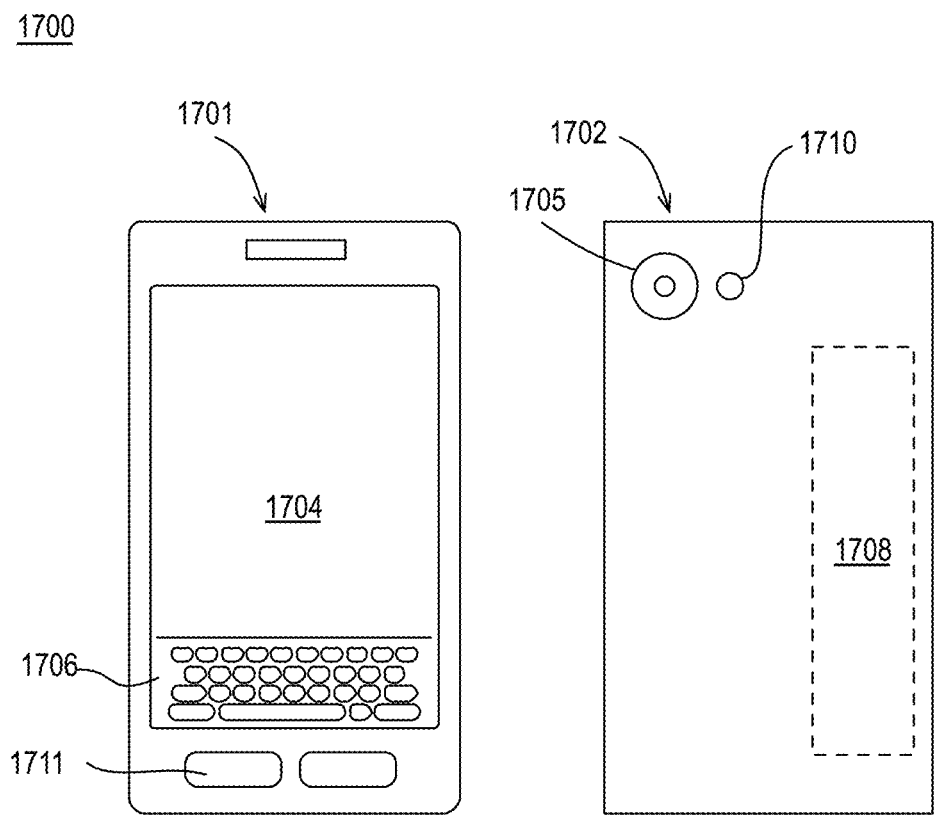
FIG. 17 illustrates an example small form factor device, all arranged in accordance with at least some implementations of the present disclosure.

As described above, system 1600 may be embodied in varying physical styles or form factors. FIG. 17 illustrates an example small form factor device 1700, arranged in accordance with at least some implementations of the present disclosure. In some examples, system 1600 may be implemented via device 1700. In other examples, device 100 or portions thereof may be implemented via device 1700. In various embodiments, for example, device 1700 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 17, device 1700 may include a housing with a front 1701 and a back 1702. Device 1700 includes a display 1704, an input/output (I/O) device 1706, and an integrated antenna 1708. Device 1700 also may include navigation features 1711. I/O device 1706 may include any suitable I/O device for entering information into a mobile computing device. Examples for I/O device 1706 may include an alphanumeric keyboard, a numeric keypad, a touch pad, input keys, buttons, switches, microphones, speakers, voice recognition device and software, and so forth. Information also may be entered into device 1700 by way of microphone (not shown), or may be digitized by a voice recognition device. As shown, device 1700 may include a camera 1705 (e.g., including a lens, an aperture, and an imaging sensor) and a flash 1710 integrated into back 1702 (or elsewhere) of device 1700. In other examples, camera 1705 and/or flash 1710 may be integrated into front 1701 of device 1700 and/or additional cameras (e.g., such that device 1700 has front and back cameras) may be provided.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a method for providing automatic perspective control for an image comprises determining a perspective control vanishing point associated with the image based on a plurality of lines detected within the image, rotating the image based on the perspective control vanishing point to generate an aligned image, and warping the aligned image based on at least partially aligning two lines of the plurality of lines that meet at the perspective control vanishing point to generate a perspective controlled image.

Further to the first embodiments, the method further comprises detecting edges within the image to generate an edge image and generating the plurality of lines based on applying a line detection to the edge image.

Further to the first embodiments, the method further comprises detecting edges within the image to generate an edge image and generating the plurality of lines based on applying a line detection to the edge image, wherein applying the line detection comprises applying a transform to the edge image to generate a transform map and including a line with a largest number of associated edge pixels in the transform map in the plurality of lines.

Further to the first embodiments, the method further comprises detecting edges within the image to generate an edge image and generating the plurality of lines based on applying a line detection to the edge image, wherein applying the line detection comprises applying a transform to the edge image to generate a transform map, including a line with a largest number of associated edge pixels in the transform map in the plurality of lines, applying a decremental transform to the transform map to generate a second transform map, and including a second line with a largest number of associated edge pixels in the second transform map in the plurality of lines.

Further to the first embodiments, the method further comprises detecting edges within the image to generate an edge image and generating the plurality of lines based on applying a line detection to the edge image, wherein applying the line detection comprises applying a transform to the edge image to generate a transform map and including a line with a largest number of associated edge pixels in the transform map in the plurality of lines and/or applying a decremental transform to the transform map to generate a second transform map and including a second line with a largest number of associated edge pixels in the second transform map in the plurality of lines.

Further to the first embodiments, determining the perspective control vanishing point comprises dividing an image space associated with the image into a plurality of bins, inserting individual intersection points of the plurality of lines into their respective bins of the plurality of bins, and determining a first vanishing point associated with a bin of the plurality of bins having a largest number of intersection points.

Further to the first embodiments, determining the perspective control vanishing point comprises dividing an image space associated with the image into a plurality of bins, inserting individual intersection points of the plurality of lines into their respective bins of the plurality of bins, and determining a first vanishing point associated with a bin of the plurality of bins having a largest number of intersection points, wherein the bins comprise 2-dimensional angular and radial bins.

Further to the first embodiments, determining the perspective control vanishing point comprises dividing an image space associated with the image into a plurality of bins, inserting individual intersection points of the plurality of lines into their respective bins of the plurality of bins, and determining a first vanishing point associated with a bin of the plurality of bins having a largest number of intersection points, wherein determining the first vanishing point comprises assigning the first vanishing point only if the first vanishing point is external to a frame of the image.

Further to the first embodiments, determining the perspective control vanishing point comprises dividing an image space associated with the image into a plurality of bins, inserting individual intersection points of the plurality of lines into their respective bins of the plurality of bins, and determining a first vanishing point associated with a bin of the plurality of bins having a largest number of intersection points, wherein the bins comprise 2-dimensional angular and radial bins and/or wherein determining the first vanishing point comprises assigning the first vanishing point only if the first vanishing point is external to a frame of the image.

Further to the first embodiments, determining the perspective control vanishing point comprises dividing an image space associated with the image into a plurality of bins, inserting individual intersection points of the plurality of lines into their respective bins of the plurality of bins, and determining a first vanishing point associated with a bin of the plurality of bins having a largest number of intersection points, and the method further comprises determining at least a second vanishing point and selecting the perspective control vanishing point from the first or second vanishing points as the vanishing point from the first or second vanishing points that is closest to a vertical axis associated with the image.

Further to the first embodiments, determining the perspective control vanishing point comprises dividing an image space associated with the image into a plurality of bins, inserting individual intersection points of the plurality of lines into their respective bins of the plurality of bins, and determining a first vanishing point associated with a bin of the plurality of bins having a largest number of intersection points, wherein the perspective control vanishing point comprises the first vanishing point and the method further comprises associating lines that meet at the perspective vanishing point as perspective control lines, wherein the two lines comprise two outer lines of the perspective control lines.

Further to the first embodiments, rotating the image comprises rotating the image about its center to move the perspective control vanishing point to a vertical axis of the image.

Further to the first embodiments, warping the aligned image comprises generating a homographic mapping based on aligning the two lines to parallel and applying the homographic mapping to the aligned image.

In one or more second embodiments, a system for providing automatic perspective control for an image comprises a memory configured to store an image and a processor coupled to the memory, the central processor to determine a perspective control vanishing point associated with the image based on a plurality of lines detected within the image, rotate the image based on the perspective control vanishing point to generate an aligned image, and warp the aligned image based on at least partially aligning two lines of the plurality of lines that meet at the perspective control vanishing point to generate a perspective controlled image.

Further to the second embodiments, the processor is further to detect edges within the image to generate an edge image and generate the plurality of lines based on an application of a line detector to the edge image.

Further to the second embodiments, the processor is further to detect edges within the image to generate an edge image and generate the plurality of lines based on an application of a line detector to the edge image, wherein the application of the line detector comprises the processor to apply a transform to the edge image to generate a transform map and include a line with a largest number of associated edge pixels in the transform map in the plurality of lines.

Further to the second embodiments, the processor is further to detect edges within the image to generate an edge image and generate the plurality of lines based on an application of a line detector to the edge image, wherein the application of the line detector comprises the processor to apply a transform to the edge image to generate a transform map and include a line with a largest number of associated edge pixels in the transform map in the plurality of lines, and wherein the processor is further to apply a decremental transform to the transform map to generate a second transform map and to include a second line with a largest number of associated edge pixels in the second transform map in the plurality of lines.

Further to the second embodiments, the processor to determine the perspective control vanishing point comprises the processor to divide an image space associated with the image into a plurality of bins, insert individual intersection points of the plurality of lines into their respective bins of the plurality of bins, and determine a first vanishing point associated with a bin of the plurality of bins having a largest number of intersection points.

Further to the second embodiments, the processor to determine the perspective control vanishing point comprises the processor to divide an image space associated with the image into a plurality of bins, insert individual intersection points of the plurality of lines into their respective bins of the plurality of bins, and determine a first vanishing point associated with a bin of the plurality of bins having a largest number of intersection points, wherein the bins comprise 2-dimensional angular and radial bins.

Further to the second embodiments, the processor to determine the perspective control vanishing point comprises the processor to divide an image space associated with the image into a plurality of bins, insert individual intersection points of the plurality of lines into their respective bins of the plurality of bins, and determine a first vanishing point associated with a bin of the plurality of bins having a largest number of intersection points, wherein the processor to determine the first vanishing point comprises the processor to assign the first vanishing point only if the first vanishing point is external to a frame of the image.

Further to the second embodiments, the processor to determine the perspective control vanishing point comprises the processor to divide an image space associated with the image into a plurality of bins, insert individual intersection points of the plurality of lines into their respective bins of the plurality of bins, and determine a first vanishing point associated with a bin of the plurality of bins having a largest number of intersection points, wherein the processor is further to determine at least a second vanishing point and to select the perspective control vanishing point from the first or second vanishing points as the vanishing point from the first or second vanishing points that is closest to a vertical axis of the image.

Further to the second embodiments, the processor to determine the perspective control vanishing point comprises the processor to divide an image space associated with the image into a plurality of bins, insert individual intersection points of the plurality of lines into their respective bins of the plurality of bins, and determine a first vanishing point associated with a bin of the plurality of bins having a largest number of intersection points, wherein the perspective control vanishing point comprises the first vanishing point and the processor is further to associate lines that meet at the perspective vanishing point as perspective control lines, wherein the two lines comprise two outer lines of the perspective control lines.

Further to the second embodiments, the processor to rotate the image comprises the processor to rotate the image about its center to move the perspective control vanishing point to a vertical axis of the image.

Further to the second embodiments, the processor to warp the aligned image comprises the processor to generate a homographic mapping based on aligning the two lines to parallel and to apply the homographic mapping to the aligned image.

In one or more third embodiments, a system for providing automatic perspective control for an image comprises means for determining a perspective control vanishing point associated with the image based on a plurality of lines detected within the image, means for rotating the image based on the perspective control vanishing point to generate an aligned image, and means for warping the aligned image based on at least partially aligning two lines of the plurality of lines that meet at the perspective control vanishing point to generate a perspective controlled image.

Further to the third embodiments, the system further comprises means for detecting edges within the image to generate an edge image and means for generating the plurality of lines based on applying a line detection to the edge image.

Further to the third embodiments, the system further comprises means for detecting edges within the image to generate an edge image and means for generating the plurality of lines based on applying a line detection to the edge image, wherein the means for applying the line detection comprise means for applying a transform to the edge image to generate a transform map and means for including a line with a largest number of associated edge pixels in the transform map in the plurality of lines.

Further to the third embodiments, the system further comprises means for detecting edges within the image to generate an edge image and means for generating the plurality of lines based on applying a line detection to the edge image, wherein the means for applying the line detection comprise means for applying a transform to the edge image to generate a transform map, means for including a line with a largest number of associated edge pixels in the transform map in the plurality of lines, means for applying a decremental transform to the transform map to generate a second transform map, and means for including a second line with a largest number of associated edge pixels in the second transform map in the plurality of lines.

Further to the third embodiments, the means for determining the perspective control vanishing point comprise means for dividing an image space associated with the image into a plurality of bins, means for inserting individual intersection points of the plurality of lines into their respective bins of the plurality of bins, and means for determining a first vanishing point associated with a bin of the plurality of bins having a largest number of intersection points.

Further to the third embodiments, the means for determining the perspective control vanishing point comprise means for dividing an image space associated with the image into a plurality of bins, means for inserting individual intersection points of the plurality of lines into their respective bins of the plurality of bins, and means for determining a first vanishing point associated with a bin of the plurality of bins having a largest number of intersection points, wherein the bins comprise 2-dimensional angular and radial bins.

Further to the third embodiments, the means for determining the perspective control vanishing point comprise means for dividing an image space associated with the image into a plurality of bins, means for inserting individual intersection points of the plurality of lines into their respective bins of the plurality of bins, and means for determining a first vanishing point associated with a bin of the plurality of bins having a largest number of intersection points, wherein the means for determining the first vanishing point comprise means for assigning the first vanishing point only if the first vanishing point is external to a frame of the image.

Further to the third embodiments, the means for determining the perspective control vanishing point comprise means for dividing an image space associated with the image into a plurality of bins, means for inserting individual intersection points of the plurality of lines into their respective bins of the plurality of bins, and means for determining a first vanishing point associated with a bin of the plurality of bins having a largest number of intersection points, wherein the system further comprises means for determining at least a second vanishing point and means for selecting the perspective control vanishing point from the first or second vanishing points as the vanishing point from the first or second vanishing points that is closest to a vertical axis associated with the image.

Further to the third embodiments, the means for determining the perspective control vanishing point comprise means for dividing an image space associated with the image into a plurality of bins, means for inserting individual intersection points of the plurality of lines into their respective bins of the plurality of bins, and means for determining a first vanishing point associated with a bin of the plurality of bins having a largest number of intersection points, wherein the perspective control vanishing point comprises the first vanishing point and the system further comprises means for associating lines that meet at the perspective vanishing point as perspective control lines, wherein the two lines comprise two outer lines of the perspective control lines.

Further to the third embodiments, the means for rotating the image comprise means for rotating the image about its center to move the perspective control vanishing point to a vertical axis of the image.

Further to the third embodiments, the means for warping the aligned image comprise means for generating a homographic mapping based on aligning the two lines to parallel and means for applying the homographic mapping to the aligned image.

In one or more fourth embodiments, at least one machine readable medium comprises a plurality of instructions that, in response to being executed on a device, cause the device to provide automatic perspective control for an image by determining a perspective control vanishing point associated with the image based on a plurality of lines detected within the image, rotating the image based on the perspective control vanishing point to provide an aligned image, and warping the aligned image based on at least partially aligning two lines of the plurality of lines that meet at the perspective control vanishing point to generate a perspective controlled image.

Further to the fourth embodiments, the machine readable medium comprises further instructions that, in response to being executed on the device, cause the device to provide automatic perspective control for the image by detecting edges within the image to generate an edge image and generating the plurality of lines based on applying a line detection to the edge image.

Further to the fourth embodiments, the machine readable medium comprises further instructions that, in response to being executed on the device, cause the device to provide automatic perspective control for the image by detecting edges within the image to generate an edge image and generating the plurality of lines based on applying a line detection to the edge image, wherein applying the line detection comprises applying a transform to the edge image to generate a transform map and including a line with a largest number of associated edge pixels in the transform map in the plurality of lines.

Further to the fourth embodiments, determining the perspective control vanishing point comprises dividing an image space associated with the image into a plurality of bins, inserting individual intersection points of the plurality of lines into their respective bins of the plurality of bins, and determining a first vanishing point associated with a bin of the plurality of bins having a largest number of intersection points.

Further to the fourth embodiments, determining the perspective control vanishing point comprises dividing an image space associated with the image into a plurality of bins, inserting individual intersection points of the plurality of lines into their respective bins of the plurality of bins, and determining a first vanishing point associated with a bin of the plurality of bins having a largest number of intersection points and the machine readable medium comprises further instructions that, in response to being executed on the device, cause the device to provide automatic perspective control for the image by determining at least a second vanishing point and selecting the perspective control vanishing point from the first or second vanishing points as the vanishing point from the first or second vanishing points that is closest to a vertical axis of the image.

Further to the fourth embodiments, warping the aligned image comprises generating a homographic mapping based on aligning the two lines to parallel and applying the homographic mapping to the aligned image.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for providing automatic perspective control for an image comprising:
    determining a perspective control vanishing point associated with the image based on a plurality of lines detected within the image by dividing an image space associated with the image into a plurality of bins, inserting individual intersection points of the plurality of lines into their respective bins of the plurality of bins, and determining a first vanishing point associated with a bin of the plurality of bins having a largest number of intersection points;
    rotating the image based on the perspective control vanishing point to generate an aligned image; and
    warping the aligned image based on at least partially aligning two lines of the plurality of lines that meet at the perspective control vanishing point to generate a perspective controlled image.

2. The method of claim 1, further comprising:
    detecting edges within the image to generate an edge image; and
    generating the plurality of lines based on applying a line detection to the edge image.

3. The method of claim 2, wherein applying the line detection comprises:
    applying a transform to the edge image to generate a transform map; and
    including a line with a largest number of associated edge pixels in the transform map in the plurality of lines.

4. The method of claim 3, further comprising:
    applying a decremental transform to the transform map to generate a second transform map; and
    including a second line with a largest number of associated edge pixels in the second transform map in the plurality of lines.

5. The method of claim 1, wherein the bins comprise 2-dimensional angular and radial bins.

6. The method of claim 1, wherein determining the first vanishing point comprises assigning the first vanishing point only if the first vanishing point is external to a frame of the image.

7. The method of claim 1, further comprising:
determining at least a second vanishing point; and
selecting the perspective control vanishing point from the first or second vanishing points as the vanishing point from the first or second vanishing points that is closest to a vertical axis associated with the image.

8. The method of claim 1, wherein the perspective control vanishing point comprises the first vanishing point and the method further comprises associating lines that meet at the perspective vanishing point as perspective control lines, wherein the two lines comprise two outer lines of the perspective control lines.

9. The method of claim 1, wherein rotating the image comprises rotating the image about its center to move the perspective control vanishing point to a vertical axis of the image.

10. The method of claim 1, wherein warping the aligned image comprises:
generating a homographic mapping based on aligning the two lines to parallel; and
applying the homographic mapping to the aligned image.

11. A system for providing automatic perspective control for an image comprising:
a memory configured to store an image; and
a processor coupled to the memory, the processor to:
determine a perspective control vanishing point associated with the image based on a plurality of lines detected within the image, wherein the processor to determine the perspective control vanishing point comprises the processor to divide an image space associated with the image into a plurality of bins, insert individual intersection points of the plurality of lines into their respective bins of the plurality of bins, and determine a first vanishing point associated with a bin of the plurality of bins having a largest number of intersection points,
rotate the image based on the perspective control vanishing point to generate an aligned image, and
warp the aligned image based on at least partially aligning two lines of the plurality of lines that meet at the perspective control vanishing point to generate a perspective controlled image.

12. The system of claim 11, wherein the processor is further to detect edges within the image to generate an edge image and generate the plurality of lines based on an application of a line detector to the edge image.

13. The system of claim 12, wherein the application of the line detector comprises the processor to apply a transform to the edge image to generate a transform map and include a line with a largest number of associated edge pixels in the transform map in the plurality of lines.

14. The system of claim 11, wherein the processor to determine the first vanishing point comprises the processor to assign the first vanishing point only if the first vanishing point is external to a frame of the image.

15. The system of claim 11, wherein the processor is further to determine at least a second vanishing point and to select the perspective control vanishing point from the first or second vanishing points as the vanishing point from the first or second vanishing points that is closest to a vertical axis of the image.

16. The system of claim 11, wherein the processor to rotate the image comprises the processor to rotate the image about its center to move the perspective control vanishing point to a vertical axis of the image.

17. The system of claim 11, wherein the processor to warp the aligned image comprises the processor to generate a homographic mapping based on aligning the two lines to parallel and to apply the homographic mapping to the aligned image.

18. At least one non-transitory machine readable medium comprising a plurality of instructions that, in response to being executed on a device, cause the device to provide automatic perspective control for an image by:
determining a perspective control vanishing point associated with the image based on a plurality of lines detected within the image by dividing an image space associated with the image into a plurality of bins, inserting individual intersection points of the plurality of lines into their respective bins of the plurality of bins, and determining a first vanishing point associated with a bin of the plurality of bins having a largest number of intersection points;
rotating the image based on the perspective control vanishing point to provide an aligned image; and
warping the aligned image based on at least partially aligning two lines of the plurality of lines that meet at the perspective control vanishing point to generate a perspective controlled image.

19. The non-transitory machine readable medium of claim 18, the machine readable medium comprising further instructions that, in response to being executed on the device, cause the device to provide automatic perspective control for the image by:
detecting edges within the image to generate an edge image; and
generating the plurality of lines based on applying a line detection to the edge image.

20. The non-transitory machine readable medium of claim 19, wherein applying the line detection comprises:
applying a transform to the edge image to generate a transform map; and
including a line with a largest number of associated edge pixels in the transform map in the plurality of lines.

21. The non-transitory machine readable medium of claim 18, the machine readable medium comprising further instructions that, in response to being executed on the device, cause the device to provide automatic perspective control for the image by:
determining at least a second vanishing point; and
selecting the perspective control vanishing point from the first or second vanishing points as the vanishing point from the first or second vanishing points that is closest to a vertical axis of the image.

22. The non-transitory machine readable medium of claim 18, wherein warping the aligned image comprises:
generating a homographic mapping based on aligning the two lines to parallel; and
applying the homographic mapping to the aligned image.

23. The non-transitory machine readable medium of claim 20, the machine readable medium comprising further instructions that, in response to being executed on the device, cause the device to provide automatic perspective control for the image by:
applying a decremental transform to the transform map to generate a second transform map; and
including a second line with a largest number of associated edge pixels in the second transform map in the plurality of lines.

24. The non-transitory machine readable medium of claim 18, wherein determining the first vanishing point comprises assigning the first vanishing point only if the first vanishing point is external to a frame of the image.

25. The system of claim 11, wherein the processor is further to apply a decremental transform to the transform map to generate a second transform map and include a second line with a largest number of associated edge pixels in the second transform map in the plurality of lines.

* * * * *